Nov. 12, 1968   J. W. EDWARDS   3,410,625
MULTI-LAYER INTERFERENCE FILM WITH OUTERMOST LAYER
FOR SUPPRESSION OF PASS-BAND REFLECTANCE
Filed Aug. 5, 1963   4 Sheets-Sheet 1
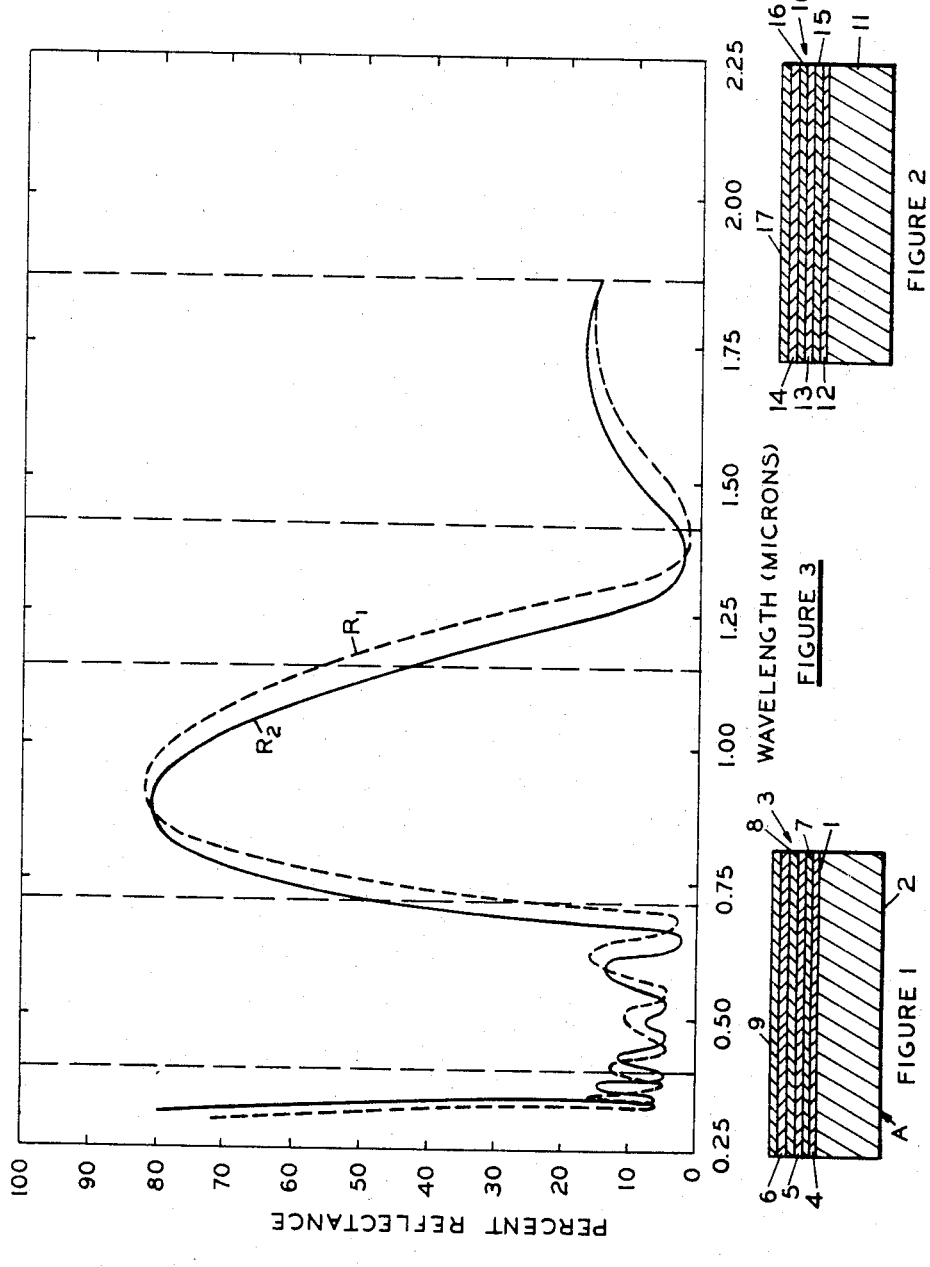
INVENTOR
JAMES W. EDWARDS
BY *Robert J. Schaap*
ATTORNEY

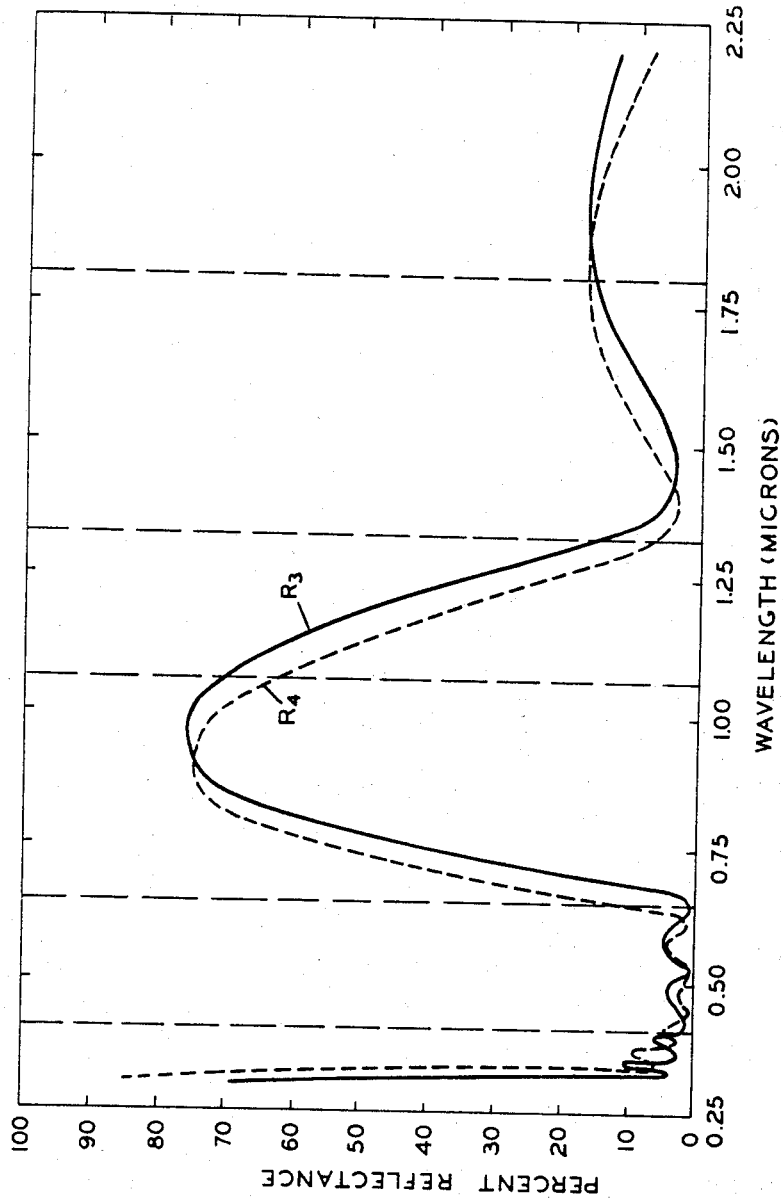

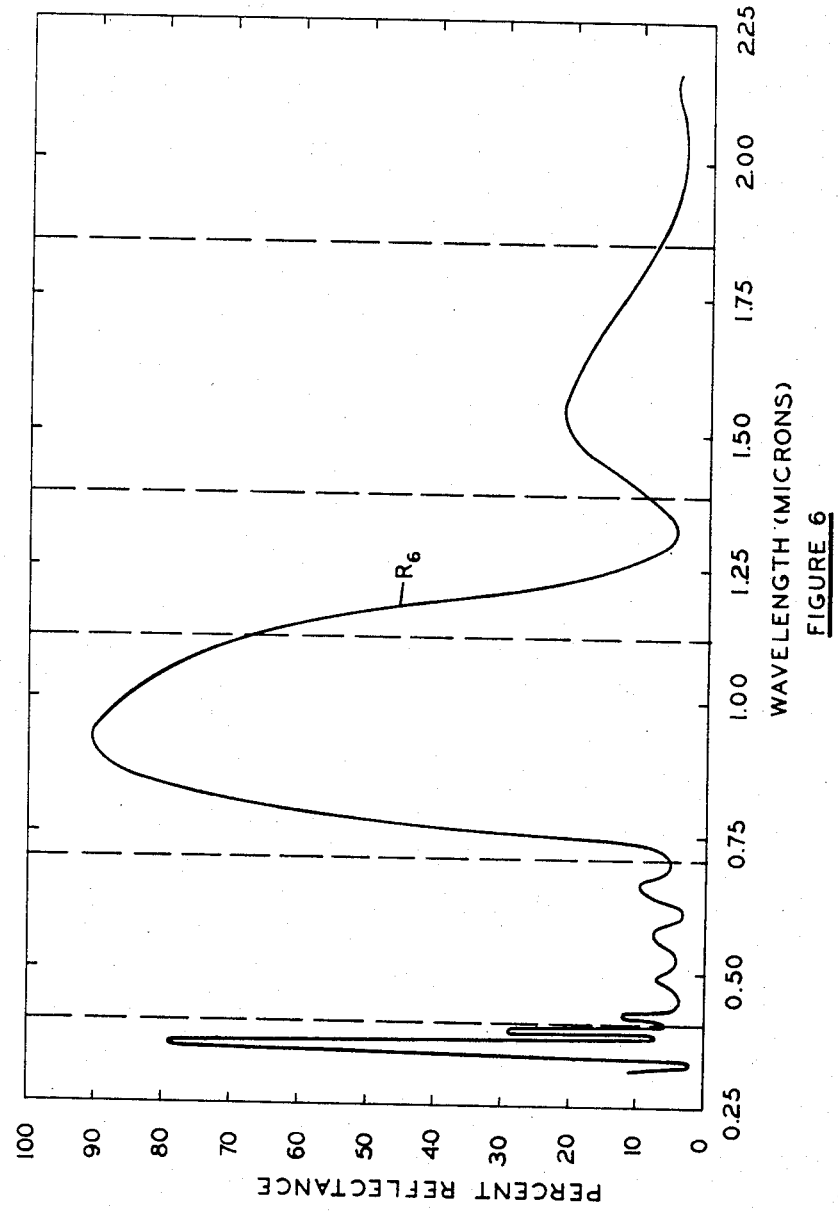

United States Patent Office 3,410,625
Patented Nov. 12, 1968

3,410,625
MULTI-LAYER INTERFERENCE FILM WITH OUTERMOST LAYER FOR SUPPRESSION OF PASS-BAND REFLECTANCE
James W. Edwards, Creve Coeur, Mo., assignor to Monsanto Company, St. Louis, Mo., a corporation of Delaware
Filed Aug. 5, 1963, Ser. No. 299,851
3 Claims. (Cl. 350—166)

This invention relates in general to certain new and useful improvements in optically thin films, and more particularly to a multi-layer film for reflecting selected wave lengths of radiation and suppressing pass-band reflectances in transmitted wave lengths of radiation.

The interest in optical properties of films has been considerably stimulated in recent years with advances in the development of methods for the preparation of thin films. There has been increasing interest in the application of optically thin films to heat rejecting windows, beam splitters, reflectors for optical instruments, one-way mirrors, sun glasses and similar devices where it is desired to alter the optical properties of solar radiation. Optically thin films have been suggested for use on windows in an attempt to overcome many of the presently existing fenestration problems, such as the prevention of heat loss and gain from solar radiation and the reduction of harshness and glare in visible transmitted solar radiation.

However, the experimental attempts to overcome the problems of heat absorption and glare have been largely unsuccessful. The application of multi-layer dielectric films to transparent substrates has created several undesirable alterations of the reflected visible light of relatively low intensity. Usually the dielectric films are selected so that they will suppress one particular wave length within the center of a wave length range to be reflected. However, this also produces various subsidiary reflectance maxima in the pass-band range, or in the spectral region to be transmitted by the multi-layer films. In many applications, the subsidiary reflectance maxima give rise to an undesirable visual appearance of the coated object. Moreover, they are objectionable because of variations in the reflected intensity in the pass-band region.

It is therefore the primary object of the present invention to provide an optically thin film for application to multi-layer dielectric films and having calculated optical thickness to suppress the subsidiary reflectance maxima in the special region to be transmitted by the multi-layer films.

It is another object of the present invention to provide an optically thin film of the type stated which is capable of reducing the intensity of subsidiary reflectance maxima in the pass-band range.

It is an additional object of the present invention to produce a multi-layer dielectric thin film for application to glass and similar transparent media which is designed to reflect a given wave length of light and which will also suppress subsidiary reflectance maxima produced in the transmitted spectral region.

It is a further object of the present invention to produce a multi-layer dielectric film of the type stated which is of calculated thickness to transmit selected colors of visible light and reflect undesired colors in the visible light range.

With the above and other objects in view, my invention resides in the novel features and form, construction, arrangement and combination of parts presently described.

In the accompanying drawings:

FIGURE 1 is a schematic front elevational view of a glass substrate having applied to one flat surface thereof a multi-layer dielectric film which has been formed in accordance with the present invention;

FIGURE 2 is a schematic front elevational view of a glass substrate having applied to one flat surface thereof a modified form of multi-layer dielectric film which is also formed in accordance with the present invention;

FIGURE 3 is a graphical illustration showing the percentage of reflected radiation for a given wave length range of radiation when such radiation is passed through a glass substrate having an optically thin multi-layer dielectric film formed in accordance with the present invention;

FIGURE 4 is a graphical illustration showing the percentage of reflected radiation when the optically thin dielectric film used in producing the graph of FIGURE 3 is provided with a layer for reducing subsidiary reflectance in the pass-band range;

Figure 5:
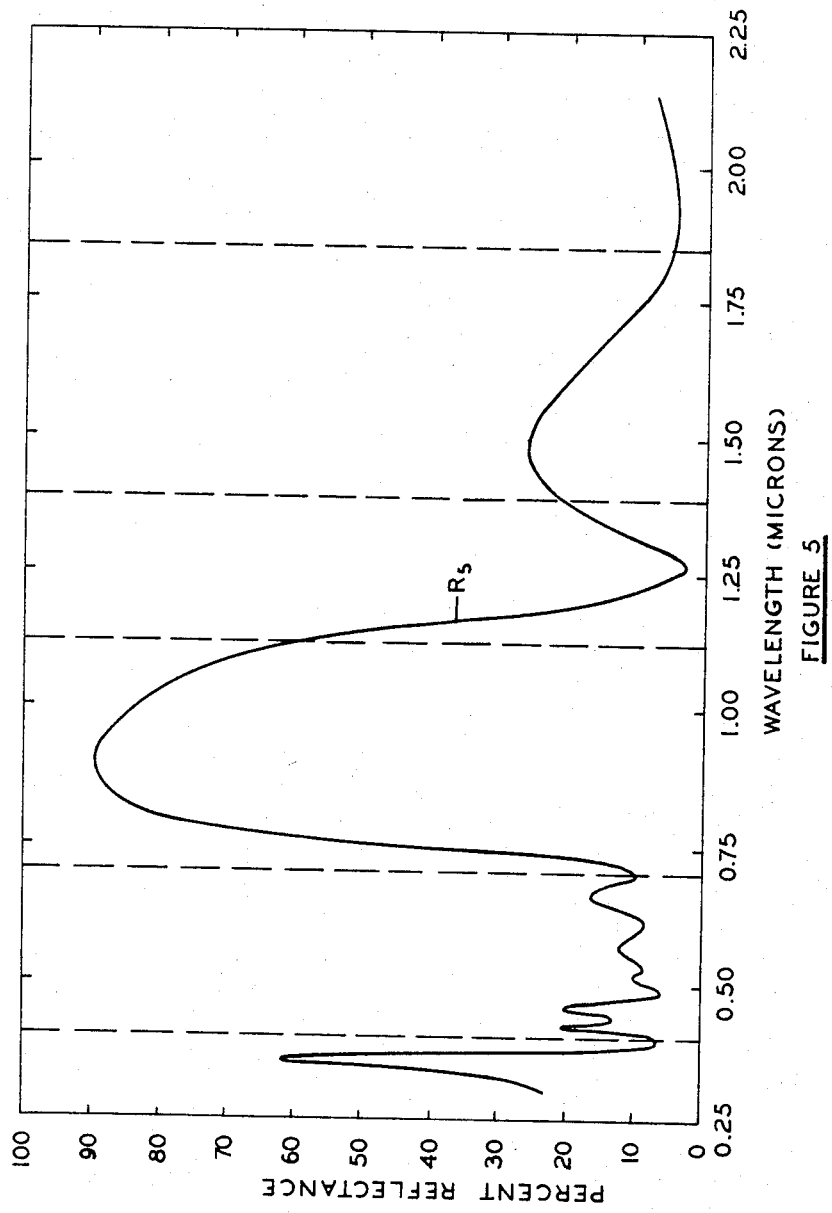

FIGURE 5 is a graphical illustration showing the percentage of reflected radiation for a given wave length range of radiation when incident to a glass substrate having another optically thin film which is formed in accordance with the present invention; and FIGURE 6 is a graphical illustration showing a percentage of reflected radiation when the optically thin film used in producing the graphical illustration of FIGURE 5 is provided with a layer for reducing subsidiary reflectance in the pass-band range.

Generally speaking, the present invention relates to an optically thin multi-layer dielectric film for application to transparent substrates, such as heat rejecting windows, beam splitters, sun glasses and the like. The present invention provides a method for calculating the desired optical thickness of each of the thin film layers in order to obtain maximum reflection of a selected wave length in a wave length range which is to be reflected. Furthermore, the present invention provides a method of calculating the desired optical thickness of the outermost layer of said multi-layer dielectric film for suppressing selected subsidiary reflectance maxima in the spectral region to be transmitted by the multi-layer film.

Referring now in more detail and by reference characters to the drawings which illustrate practical embodiments of the present invention A designates a glass substrate having top and bottom faces 1, 2 respectively. While the substrate A selected is glass, it should be understood that any media which is transparent in the desired wave length range, such as quartz, for example, could be used and the invention is not limited to the use of glass as a substrate.

Suitably applied to the upper surface 1 of the substrate A, by any conventional method is a multi-layer optically thin dielectric film 3, which consists of alternating dielectric layers 4, 5, 6 having high refractive indices. The layer 4 is facewise disposed upon the face 1 of the substrate A, and interposed between the layers 4, 5 is a dielectric layer 7 having a relatively low refractive index. Similarly interposed between the layers 5, 6 is a dielectric layer 8 also having a relatively low refractive index. Preferably, the layers 4, 5 and 6 are formed of the same high refractive index material and the layers 7, 8 are formed of the same low refractive index material. In actual practice, each of the succeeding layers forming part of the film 3 are formed by vapor film deposition. However, the present invention is not limited to this method and any suitable conventional method of applying these layers could be employed.

The high refractive index layers 4, 5 and 6 can be formed of any suitable transparent dielectric material such as zinc sulfide, ceric oxide, lead molybdate, and lead tungstate. Similarly, any suitable transparent dielectric material, having a low refractive index, such as cryolite, magnesium fluoride, lithium fluoride and aluminum fluoride could be used to form the layers 7 and 8.

In connection with the present invention, it has been found that by forming each of the high refractive index layers 4, 5 and 6 and each of the low refractive index layers 7 and 8 with an optical thickness of one-quarter wave length for the maximum wave length to be reflected at the center of the principle reflectance band, optimum results are obtained. For quarter wave low refractive index layers the thickness can be determined by the following relationship:

$$t_L = \frac{\lambda_0}{4n_L}$$

where $t_L$ represents the thickness of the low index of refraction layers, $\lambda_o$ represents the wave length to be reflected at the center of the principal reflectance band, and $n_L$ represents the refractive index of the low refractive index layers. Similarly, for quarter-wave high refractive index layers, the thickness can be determined by the following relationship:

$$t_h = \frac{\lambda_0}{4n_h}$$

where $t_h$ represents the thickness of the high refractive index layers, and $n_h$ represents the index of refraction of the high refractive index layers.

A glass substrate having a physical thickness of one-fourth inch was provided with a 5-layer dielectric film formed in accordance with the present invention. Zinc sulfide having a refractive index of $n_h = 2.20$ was selected for the high refractive index layers 4, 5 and 6. Magnesium fluoride having an index of refraction $n_L = 1.37$ was selected for the low index of refraction layers 7 and 8. When radiation from a tungsten lamp source having the spectral distribution of solar radiation is directed on the above-described multi-layer dielectric film 3 at an angle of incidence of 0°, the spectral reflectance curve $R^1$ (FIGURE 3) is obtained. When the same intensity radiation is directed on the above-mentioned film 3 at an angle of incidence of 30°, the spectral reflectance curve $R^2$ shown in FIGURE 3 is obtained. These curves are plotted by passing the reflected radiation from the substrate into a "Cary-14" recording spectrophotometer. It can be seen that approximately 80% of light having a wave length of approximately 0.90 micron, in the infrared wave length range is reflected. It is to be noted, that infra-red light within the wave length range of approximately 0.70 to approximately 1.15 microns contains the greatest amount of heat energy. Thus, it follows that the greatest portion of light containing the heat energy was reflected by the multi-layer film 3. Solar radiation in the "far" infra-red wave length range, that is, beyond 1.12 microns, has such a low energy content that the heat thus produced is negligible and is not considered. It can also be seen by reference to FIGURE 3, that over 80% of the visible light within the wave length range of 0.04 micron to 0.70 micron was transmitted through the film 3.

The following data is obtained when radiation having the spectral distribution of solar radiation is directed on the film 3 at an angle of incidence of 0°.

TABLE I

| Spectral Region | Wave Lengths (Microns) | Incident Energy (Percent) | Reflected Energy (Percent) | Mean Energy Reflectance (Percent) |
|---|---|---|---|---|
| UV | 0.30–0.40 | 2.7 | 0.6 | 10.8 |
| Visible | 0.40–0.70 | 44.4 | 4.6 | 9.1 |
| IR–1 | 0.70–1.12 | 36.4 | 25.6 | 70.2 |
| IR–2 | 1.12–1.38 | 8.6 | 2.4 | 28.7 |
| IR–3 | 1.38–1.85 | 6.6 | 0.8 | 12.5 |
| IR–4 | 1.85–2.14 | 1.2 | 0.1 | 12.8 |
| Total | 0.30–2.14 | 100.0 | 34.1 | 34.1 |

It is to be noted that the infra-red wave length range 0.70 micron to 2.25 microns has been subdivided into four ranges as illustrated in FIGURE 9. However, as pointed out above, light within the infra-red wave length range is 0.70 to 1.15 microns designated as IR–1 is of the greatest concern, since this is the solar radiation range of sunlight which carries the greatest intensity of heat.

When radiation having the spectral distribution of solar radiation is directed on the film 3 at an angle of incidence of 30°, the following data is obtained as set forth in Table II.

TABLE II

| Spectral Region | Wave Lengths (Microns) | Incident Energy (Percent) | Reflected Energy (Percent) | Mean Energy Reflectance (Percent) |
|---|---|---|---|---|
| UV | 0.30–0.40 | 2.7 | 0.6 | 11.5 |
| Visible | 0.40–0.70 | 44.4 | 5.5 | 11.6 |
| IR–1 | 0.70–1.12 | 36.4 | 26.4 | 72.6 |
| IR–2 | 1.12–1.38 | 8.6 | 1.3 | 15.5 |
| IR–3 | 1.38–1.85 | 6.6 | 1.0 | 15.6 |
| IR–4 | 1.85–2.14 | 1.2 | 0.1 | 11.0 |
| Total | 0.30–2.14 | 100.0 | 34.9 | 34.9 |

In each of Tables I and II, the incident energy refers to the percent of total solar energy in the wave length interval which is incident to the film; the reflected energy refers to the percent of the total incident energy which is specularly reflected by the film; and the mean energy reflectance refers to the percent of incident solar energy which is reflected for a particular wave length range of solar radiation.

By further reference to FIGURE 3, it can be seen that various subsidiary reflectance maxima were obtained at 0.6 micron, 0.47 micron and 0.40 micron in the visible light wave length range. The largest subsidiary reflectance maximum at 0.6 micron gives rise to a relatively intense reflection color which is sometimes undesirable.

It has been found that this largest subsidiary reflection, as well as the other subsidiary reflections can bt significantly reduced by adding a low refractive index or terminating layer 9 to the multi-layer film 3. In connection with the present invention, it has also been found that when the optical thickness of the outer layer 9 is calculated according to the following relationship, optimum suppression of a selected subsidiary wave length is obtained:

$$t' = \frac{X\lambda'}{\lambda o} t$$

wherein $t'$ represents the thickness of the outer or terminating layer 9, $\lambda'$ represents the wave length of the subsidiary maximum reflection which is to be suppressed, and X is any odd numbered integer from 1 to 15. Since $$t = \frac{\lambda o}{4n}$$

it therefore follows that the optical thickness of the outer layer 9 can be determined according to the following relationship:

$$t' = \frac{X\lambda'}{4n}$$

It has been found that when the optical thickness of the outer layer 9 is calculated according to this relationship, that substantially equivalent results are obtained. It has been found that an odd numbered integer gives an interference which is exactly out of phase with the reflectance peak to be suppressed. However, where the film is calculated with a thickness where X is an odd integer greater than 15, the film is unduly thick and is not stable because of internal tensions within the film. Moreover, because of the thickness of the film, adherence to the substrate is considerably reduced. Furthermore, as the film becomes unduly thick a greater number of fringes are found in the visible wave length range, and it becomes difficult to suppress each of these fringes. While X can be any odd numbered integer not greater than 15, X is preferably 1, 3 or 5.

When a terminating layer 9 formed of magnesium fluoride and having an index of refraction of 1.37 is applied to the multi-layer film used to produce the reflection curve of FIGURE 3, the reflectance curve of FIGURE 4 is obtained. It can be seen, by reference to FIGURE 4, that the reflectance of light in the infrared range of 0.70 to 1.12 and particularly light at the wave length range of 0.90 was slightly reduced. However, it can be seen that subsidiary reflections in the visible wave length range were greatly suppressed. In fact, the maximum subsidiary reflectance at 0.60 micron was reduced from 15% reflectance to approximately 5% reflectance. In order to produce the reflection curve of FIGURE 4, radiation from the same tungsten lamp was directed on the multi-layer film at an angle of incidence of 0° and the reflectance curve $R^3$ is obtained. Radiation from this lamp was directed on the film at an angle of incidence of 30° and the spectral reflectance curve $R^4$ is obtained.

When the radiation from the tungsten lamp source having the distribution of solar radiation was directed on the film 3 having the outer layer 9, at an angle of incidence of 0°, the following data was obtained as set forth in Table III.

TABLE III

| Range | Wave Lengths (Microns) | Incident Energy (Percent) | Reflected Energy (Percent) | Mean Energy Reflectance (Percent) |
|---|---|---|---|---|
| UV | 0.30–0.40 | 2.7 | 0.5 | 6.8 |
| Visible | 0.40–0.70 | 44.4 | 2.2 | 3.5 |
| IR-1 | 0.70–1.12 | 36.4 | 22.2 | 61.1 |
| IR-2 | 1.12–1.38 | 8.6 | 3.2 | 37.0 |
| IR-3 | 1.38–1.85 | 6.6 | 0.6 | 10.0 |
| IR-4 | 1.85–2.14 | 1.2 | 0.1 | 15.5 |
| Total | 0.30–2.14 | 100.0 | 28.8 | 28.8 |
| IR-Total | 0.70–2.14 | 53.0 | 26.4 | 49.7 |

When radiation of the same intensity distribution was directed on the film 3 having the outer layer 9 at an angle of incidence of 30°, the following data was obtained as set forth in Table IV.

TABLE IV

| Range | Wave Lengths (Microns) | Incident Energy (Percent) | Reflected Energy (Percent) | Mean Energy Reflectance (Percent) |
|---|---|---|---|---|
| UV | 0.30–0.40 | 2.7 | 0.5 | 5.5 |
| Visible | 0.40–0.70 | 44.4 | 3.1 | 5.8 |
| IR-1 | 0.70–1.12 | 36.4 | 23.7 | 65.0 |
| IR-2 | 1.12–1.38 | 8.6 | 2.0 | 23.7 |
| IR-3 | 1.38–1.85 | 6.6 | 0.9 | 13.9 |
| IR-4 | 1.85–2.14 | 1.2 | 0.1 | 13.9 |
| Total | 0.30–2.14 | 100.0 | 30.3 | 30.3 |
| IR-Total | 0.70–2.14 | 53.0 | 26.9 | 50.7 |

When the maximum subsidiary reflectance of 0.60 micron is suppressed, a greater portion of light at this wave length will be transmitted. Consequently, in this range which is closer to the infra-red range a greater portion of red light will be transmitted. It also follows, that if a subsidiary reflectance closer to 0.40 micron wave length were suppressed, a greater amount of blue light will be transmitted.

The effect which low refractive index terminating layers has on multi-layer dielectric films can be seen from Table V set forth below.

TABLE V

[Effect of Low Refractive Index Terminating Layer on Multi-Layer Films. Design Wave Length 0.9]

| Film Design | Mean Visible Reflectance, Percent | Peak Visible Reflectance, Percent | Mean Infra-Red Transmittance, Percent |
|---|---|---|---|
| AHLHLHG | 0.1 | 17.3 | 45.2 |
| A(.67L)HLHLHG | 3.5 | 6.0 | 50.3 |
| ALHLHLHG | 9.5 | 16.0 | 50.3 |
| A(2L)HLHLHG | 5.1 | 11.0 | 52.3 |
| A(2.2L)HLHLHG | 7.0 | 13.9 | 52.5 |

Referring to the data of Table V, a design wave length of 0.9 micron was used with the various indicated multi-layer films. The source of radiation used to produce the data in the table was from a tungsten lamp which had a radiation distribution equal to that of solar distribution, and the radiation was directed at an angle of incidence of 0°. In Table V, A represents the air media, G represents the substrate, glass, H refers to the layer having a high index of refraction, and L refers to the layer having a low index of refraction. Moreover, the data is given for the multi-layer films only, and reflectance and absorbance of radiation by the glass substrate is not included. The .67L and 2L layers in Table V create a reflected wave which is exactly out of phase with the reflection maximum at 0.6 micron. These .67L and 2L layers serve as anti-reflection layers for 0.6 micron radiation when directed on films designed for peak infra-red reflection at 0.9 micron.

The invention is further illustrated by, but not limited to, the following examples.

EXAMPLE 1

A seven-layer dielectric film consisting of lead molybdate having a refractive index of 2.40 and cryolite having a refractive index of 1.33 was applied to a glass substrate one-fourth inch thick and having a refractive index of 1.520. The layers were successively applied by the vapor deposition process and one of the layers having a high refractive index was in facewise contact with the upper surface of the glass substrate. Thus, the glass substrate had a film which consisted of 4 layers of lead molybdate alternated with 3 layers of cryolite. Radiation from a tungsten lamp source having the spectral distribution of solar radiation was directed on the multi-layer dielectric film at an angle of incidence of 30°, and the spectral reflectance curve $R^5$ in FIGURE 5 was obtained by passing a reflected radiation into a "Cary–14" recording spectrophotometer. It can be seen, that approximately 90% of radiation at the 0.90 micron wave length was reflected. It can also be seen, that 5 subsidiary reflectance peaks were produced in the visible wave length range of 0.40 micron to 0.70 micron. These peaks range from 10 to 22% reflectance within this range, the largest peak being at 0.42 micron having a reflectance of 22%.

A terminating layer of cryolite which was two-thirds the thickness of any of the aforementioned layers was then added by the same vapor deposition process, in order to suppress the pass-band reflectance maxima within the visible light range. Radiation from the same tungsten lamp source having the spectral distribution of solar radiation was then directed on the film at an angle of incidence of 30°, and the spectral reflectance curve $R^6$ in FIGURE 6 was obtained by passing the reflected light into the same "Cary" recording spectrophotometer. It can thus be seen, by reference to FIGURE 6, that the reflectance at the 0.90 micron wave length was not affected by the additional layer, but that the maximum subsidiary reflectance at 0.42 micron was reduced to 14%. Moreover, each of the other subsidiary reflectance maxima were considerably reduced.

When radiation from the tungsten lamp source having the spectral distribution of solar radiation was directed on the film at the angle of incidence of 30°, the following data was obtained.

TABLE VI

| Spectral Region | Wave Lengths (Microns) | Incident Energy (Percent) | Reflected Energy (Percent) | Mean Energy Reflectance (Percent) |
|---|---|---|---|---|
| UV | 0.30–0.40 | 2.7 | .7 | 27.5 |
| Visible | 0.40–0.70 | 44.4 | 2.5 | 5.7 |
| IR-1 | 0.70–1.12 | 36.4 | 23.7 | 65.0 |
| IR-2 | 1.12–1.38 | 8.6 | 2.3 | 26.2 |
| IR-3 | 1.38–1.85 | 6.6 | 1.2 | 18.2 |
| IR-4 | 1.85–2.14 | 1.2 | .04 | 3.5 |
| Total | 0.30–2.14 | 100.0 | 30.5 | 30.5 |

EXAMPLE 2

A five-layer dielectric film having alternating layers of zinc sulfide with a refractive index of 2.20 and magnesium fluoride with a refractive index of 1.37 was applied to a glass substrate one-fourth inch thick and having a refractive index of 1.52. There were three layers of zinc sulfide, one of the zinc sulfide layers being in facewise contact with the glass substrate and interposed between the three layers of zinc sulfide were the two layers of magnesium fluoride. The refractive indexes and the thicknesses of the films are set forth below:

|         | Refraction | Thickness, Microns |
|---------|------------|---------------------|
| Air     | 1.00000    |                     |
| Layer 1 | 2.20000    | 0.102               |
| Layer 2 | 1.37000    | 0.164               |
| Layer 3 | 2.20000    | 0.102               |
| Layer 4 | 1.37000    | 0.164               |
| Layer 5 | 2.20000    | 0.102               |
| Glass   | 1.52000    | Massive             |

Radiation from a tungsten lamp source having the spectral distribution of solar radiation is directed on the multi-layer film at an angle of incidence of 0° and an angle of incidence of 30°, and the following data is obtained by passing the reflected light into a "Cary-14" recording spectrophotometer.

[Angle of Incidence = 0 Degrees. Energy and Mean Reflectance in Specified Ranges of the Spectrum]

| Range | Wave Lengths (Microns) | Incident Energy (Percent) | Reflected Energy (Percent) | Mean Energy Reflectance (Percent) |
|-------|------------------------|---------------------------|----------------------------|-----------------------------------|
| UV       | 0.30–0.40 | 2.7   | 0.6  | 10.8 |
| Visible  | 0.40–0.70 | 44.4  | 4.6  | 9.1  |
| IR-1     | 0.70–1.12 | 36.4  | 25.6 | 70.2 |
| IR-2     | 1.12–1.38 | 8.6   | 2.4  | 28.7 |
| IR-3     | 1.38–1.85 | 6.6   | 0.8  | 12.5 |
| IR-4     | 1.85–2.14 | 1.2   | .1   | 12.8 |
| Total    | 0.30–2.14 | 100.0 | 33.3 | 33.3 |
| IR-Total | 0.70–2.14 | 53.0  | 29.1 | 54.8 |

[Angle of Incidence = 30 Degrees. Energy and Mean Reflectance in Specified Ranges of the Spectrum]

| Range | Wave Lengths (Microns) | Incident Energy (Percent) | Reflected Energy (Percent) | Mean Energy Reflectance (Percent) |
|-------|------------------------|---------------------------|----------------------------|-----------------------------------|
| UV       | 0.30–0.40 | 2.7   | 0.6  | 11.5 |
| Visible  | 0.40–0.70 | 44.4  | 5.5  | 11.6 |
| IR-1     | 0.70–1.12 | 36.4  | 26.4 | 72.6 |
| IR-2     | 1.12–1.38 | 8.6   | 1.3  | 15.5 |
| IR-3     | 1.38–1.85 | 6.6   | 1.0  | 15.6 |
| IR-4     | 1.85–2.14 | 1.2   | 0.1  | 11.0 |
| Total    | 0.30–2.14 | 100.0 | 34.9 | 34.9 |
| IR-Total | 0.70–2.14 | 53.0  | 29.0 | 54.7 |

It is possible to provide a modified form of optically thin dielectric multi-layer film 10 for application to transparent substrates, substantially as shown in FIGURE 2. The multi-layer dielectric film 10 is suitably applied to a flat surface of any suitable transparent substrate 11 by a conventional method such as vapor film deposition. The multi-layer dielectric film 10 is substantially similar to the film 3 and includes alternating layers 12, 13 and 14 formed of materials having high indices of refraction and which are substantially identical to the layers 4, 5 and 6. The dielectric film 10 also includes a layer 15 interposed between the layers 12–13 and having a low index of refraction and a layer 16 interposed between the layers 13 and 14 and also having a low index of refraction. The layers 15 and 16 are substantially identical to the layers 7–8 in the film 3.

Suitably applied to the exterior surface of the outer layer 14 is an optically thin dielectric terminating layer 17 having a low refractive index but which is formed of a different material than either of the layers 15–16. The layer 17 can be formed of any suitable transparent dielectric material such as cryolite, lithium fluoride, and magnesium fluoride. Moreover, the optical thickness of the layer 17 is calculated with the same relations as used in the calculation of the optical thickness of the layer 9.

It should be understood, that changes and modifications in the construction, arrangement and combination of parts presently described and pointed out can be made and substituted for those herein shown without departing from the nature and principle of my invention.

Having thus described my invention, what I desire to claim and secure by Letters Patent is:

1. An optical device comprising a substrate which is transparent in the visible wave length range of solar radiation where it is desired to transmit radiation, an optically thin multilayer film applied to at least one surface of said substrate, said film comprising at least two layers of dielectric material having a high index of refraction on $n_h$ and one of said last-named layers being facewise disposed on said substrate, and at least one layer of dielectric material having a low index of refraction of $n_L$, where $n_L$ is less than $n_h$, said layers in combination being designed to reflect radiation in the infrared radiation wave length range and transmit radiation in the visible wave length range of radiation based on a design wave length of 0.9 micron, each of the layers with an index of refraction of $n_h$ being formed of a material having a thickness determined according to the following relation:

$$t_h = \frac{0.9}{4n_h}$$

each of the layers with an index of refraction of $n_L$ being formed of a material having a thickness determined according to the following relation:

$$t_L = \frac{0.9}{4n_L}$$

where $t_h$ is the thickness of the layer with index of refraction on $n_h$, $t_L$ is the thickness of the layer having an index of refraction of $n_L$ and 0.9 micron represents the principal wave length range of radiation to be reflected, and an outermost subsidiary suppression layer of dielectric material having a thickness of such size to suppress a selected subsidiary reflectance of 0.6 micron in the visible wave length range, said outermost layer being facewise disposed on a layer of material having a high index of refraction, the thickness of said outermost layer being determined according to the following relationship:

$$t' = \frac{X\,0.6}{4n}$$

where $t'$ is the thickness of the outermost layer, $n$ is the index of refraction of the outermost layer, and X is any odd numbered positive integer less than fifteen, the index of refraction of said outermost layer $n$ being effectively less than $n_h$.

2. The optically thin film of claim 1 further characterized in that $n = n_L$.

3. The optically thin film of claim 1 further characterized in that the outermost layer is formed of a dielectric material which is different than the dielectric material in any other layer.

(References on following page)

References Cited

UNITED STATES PATENTS

| | | | |
|---|---|---|---|
| 2,422,954 | 6/1947 | Dimmick | 88—105 |
| 2,668,478 | 2/1954 | Schroder | 88—112 |
| 2,742,819 | 4/1956 | Koch et al. | |
| 3,235,397 | 2/1966 | Millendorfer. | |

FOREIGN PATENTS 730,640  5/1955  Great Britain.

OTHER REFERENCES

Dimmick, "A New Dichroic Reflector and Its Application To Photocell Monitoring Systems," Article in Journal of The Society of Motion Picture Engineers, January 1942, pp. 36–44.

DAVID H. RUBIN, *Primary Examiner.*

J. M. GUNTHER, *Assistant Examiner.*